United States Patent Office

3,838,145
Patented Sept. 24, 1974

3,838,145
DISAZO COMPOUNDS OF LOW WATER SOLUBILITY
Ruedi Altermatt, Hauptstrasse 35, Tecknau, Basel-Land, Switzerland
No Drawing. Filed July 2, 1969, Ser. No. 838,665
Claims priority, application Switzerland, July 16, 1968, 10,630/68
Int. Cl. C09b 33/06; D06p 3/52, 3/60
U.S. Cl. 260—184
14 Claims

ABSTRACT OF THE DISCLOSURE

This invention relates to disazo compounds of low water solubility which are excellent for dyeing and printing fibres and textiles consisting of synthetic or semi-synthetic, high molecular-weight organic substances of hydrophobic character. Such fibres include those of linear aromatic polyesters, cellulose diacetate, cellulose triacetate and polyamide. Resulting dyeings are fast, e.g., to thermofixation, sublimation, pleating, gas fumes, cross-dyeing, dry cleaning, chlorine and wet tests.

The dyes are of the general type of

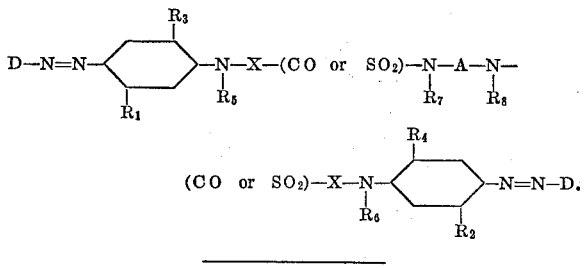

The new compounds are of the formula

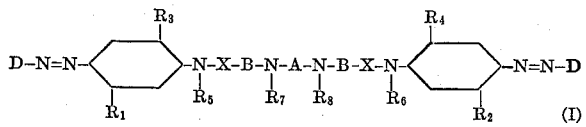

where the two D symbols, independently of each other, stand for identical or different radicals of aromatic or heterocyclic diazo components,
$R_1$ and $R_2$, independently of each other, for hydrogen or halogen atoms, acylamino groups or alkyl or alkoxy groups which may be substituted.
$R_3$ and $R_4$, independently of each other, for hydrogen or halogen atoms or alkyl or alkoxy radicals which may be substituted,
$R_5$ and $R_6$, independently of each other, for hydrogen atoms or alkyl radicals which may be substituted,
$R_7$ and $R_8$ singly for hydrogen atoms or optionally substituted alkyl groups or jointly for an alkylene group,
the two X symbols for divalent hydrocarbon radicals which may be substituted,
the two B symbols for —CO— or —SO$_2$— and
A for an optionally substituted alkylene or phenylene radical.

$R_3$ and $R_5$ or $R_4$ and $R_6$, together with the interjacent atoms, may form a heterocyclic ring system, and the molecule is free from carboxylic acid and sulphonic acid groups.

Suitable D radicals of diazo components are, e.g., penhyl, naphthyl, thiazoyl, benzothiazolyl, thiodiazolyl, imidazolyl or pyrazolyl radicals which may be substituted by halogen atoms, in particular chlorine or bromine atoms, alkyl, alkoxy, cyano, nitro, thiocyano, acyl, acyloxy or acylamino groups.

All the alkyl groups on the molecule, including the alkoxy groups, bear preferably 1, 2, 3 or 4 carbon atoms and may bear further substituents, e.g. halogen atoms, in particular chlorine or bromine atoms, phenyl, alkoxy, cyano, thiocyano, acyl or acyloxy groups.

The preferred acyl groups are of formula R—Y— or R'—Z—, where

R represents a hydrocarbon radical which may bear the aforenamed substituents and/or hetero atoms, preferably an alkyl or phenyl radical,
—Y a radical —O—CO— or —SO$_2$—,
R' a hydrogen atom or R,
—Z a radical —CO—, —NR"CO— or —NR"SO$_2$— and
R" a hydrogen atom or R.

If A represents a methylene radical, it may be substituted by an optionally substituted alkyl or aryl radical.

The preferred X and A radicals are alkylene radicals having 1, 2, 3 or 4 carbon atoms.

The preferred compounds are of the formula

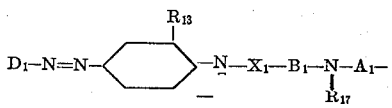

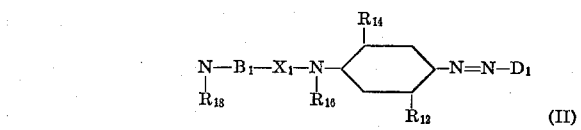

(II)

where the two $D_1$ symbols, independently of each other, stand for phenyl radicals which are unsubstituted or substituted by chlorine or bromine atoms, cyano, nitro, methylsulphonyl, benzylsulphonyl, methylaminosulphonyl, dimethylaminosulphonyl, benzoyl or acetylamino groups or a group of formula —CH=N—OH; thiazolyl radicals which are unsubstituted or substituted by methyl or nitro groups, benzothiazolyl radicals substituted by methylsulphonyl or thiocyano groups; 1-phenyl-3-methylpyrazole radicals or methylsulphonyl-naphthyl radicals;
$R_{11}$ and $R_{12}$, independently of each other, for hydrogen, chlorine or bromine atoms, methyl, methoxy, acetylamino, propionylamino, chloropropionylamino or methoxycarbonylamino groups;
$R_{13}$ and $R_{14}$, independently of each other, for hydrogen, chlorine or bromine atoms, methyl, methoxy or ethoxy groups;
$R_{15}$ and $R_{16}$, independently of each other, for hydrogen atoms or alkyl groups having 1 to 3 carbon atoms which are unsubstituted or bear as substituents chlorine or bromine atoms, hydroxyl, methoxy, ethoxy, cyano, phenyl, formyloxy, acetoxy, propionyloxy, benzoyloxy, methoxycarbonyl, methoxycarbonyloxy, ethoxycarbonyloxy or aminocarbonyl groups;
$R_{17}$ and $R_{18}$ each for a hydrogen atom or a methyl or cyanethyl group or jointly for an ethylene bridge;
the two $X_1$ each for a group of formula —CH$_2$—, —CH$_2$CH$_2$—;

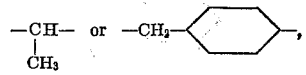

the two $B_1$ each for —CO— or —SO$_2$—; and
$A_1$ for a bridge member of the formula —CH$_2$—, C$_2$H$_4$—, —C$_3$H$_6$—,

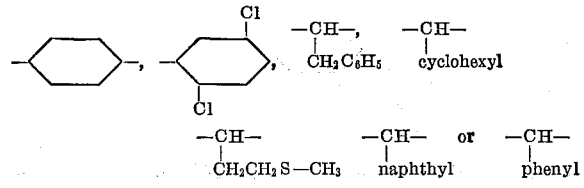

| Continued | Shade on polyester |
|---|---|
| 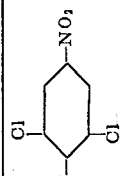 | Reddish-brown. |
| 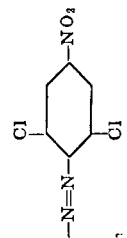 | Red brown. |
| 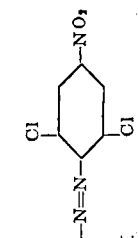 | Yellow brown. |
| 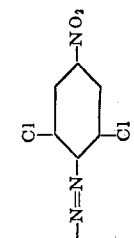 | Do. |
| 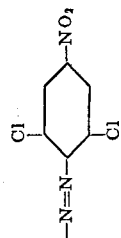 | Do. |
| 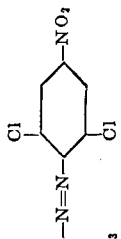 | Red brown. |
| 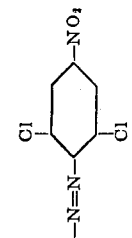 | Yellow brown. | formula with a mixture of one mole of an azo compound of the formula

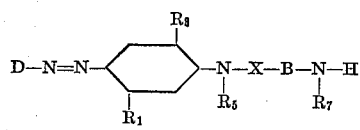
(VII)

and one mole of an azo compound of the formula

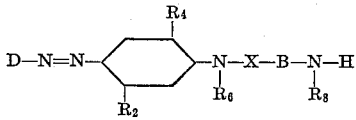
(VIII)

in the presence of a dilute mineral acid, preferably sulphuric acid or an alkane acid containing 2–4 carbon atoms, e.g. glacial acetic acid, in the presence of a small amount of sulphuric acid and at elevated temperature, if necessary.

Further, azo compounds of formula (I) can be obtained by condensing one mole of a diamine of formula

(IX)

with a mixture of one mole of an azo compound of the formula

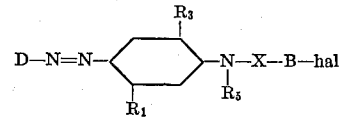
(X)

and one mole of an azo compound of the formula

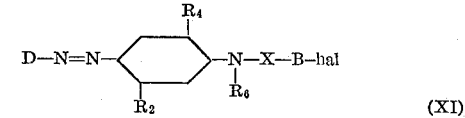
(XI)

where in formulae (X) and (XI) hal represents a chlorine or bromine atom, preferably at temperatures between 0° and 100° C., in water or in an indifferent organic solvent, e.g. toluene, xylene, dioxane, nitrobenzene and in the presence of an acid-binding agent, e.g. alkali carbonates, bicarbonates, acetates or magnesium oxide.

Azo compounds of formula (I) can be arrived at by condensing one mole of a compound of the formula

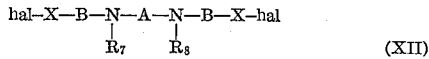
(XII)

where hal represents a chlorine or bromine atom, with a mixture of one mole of an azo compound of the formula

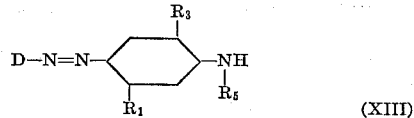
(XIII)

and one mole of an azo compound of the formula

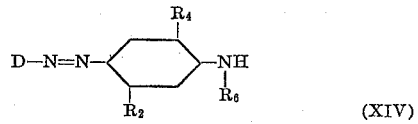
(XIV)

Finally, azo compounds of formula (I) can be obtained by reacting one mole of a compound of the formula

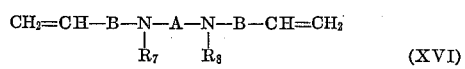
(XVI)

with a mixture of one mole of an azo compound of the formula

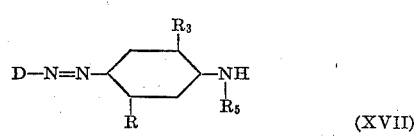
(XVII)

and one mole of an azo compound of the formula

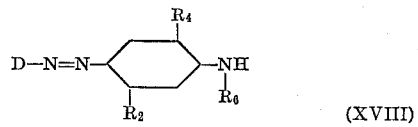
(XVIII)

in solution in a fatty acid containing 2–4 carbon atoms, preferably glacial acetic acid, and at temperatures in the range of 70° to 150° C.

It is desirable to convert the new dyes thus obtained into dye preparations before their application. They can be worked up to dye preparations by known methods, e.g. grinding in the presence of dispersing agents and/or fillers, with subsequent drying in a vacuum or atomizer dryer as required. On the addition of a suitable volume of water they can be exhaustion dyed, pad dyed or printed at long or short liquor ratio.

From aqueous dispersion the dyes build up excellently on textiles of synthetic and semi-synthetic hydrophobic organic substances of high molecular weight. They are particularly suitable for dyeing and printing textiles of linear aromatic polyesters, cellulose diacetate, cellulose triacetate and polyamide fibres; they are also dyeable on polyolefins.

The known dyeing and printing methods are employed, e.g. that described in French Patent 1,445,371.

The dyeings are very fast, having outstandingly good fastness to thermofixation, sublimation, pleating, gas fumes, cross dyeing, dry cleaning, chlorine and wet tests, such as water, washing and perspiration. They are highly stable to the action of the pre-cure and post-cure permanent press finishing processes, are readily dischargeable and reserve wool and cotton well. Having exceptionally good light fastness even in pale shades, the new dyes are highly suitable as combination elements for the production of fashionable pastel shades. They are stable at temperatures up to at least 220° C. and especially in the range of 80° to 140° C. This stability is not adversely affected by the liquor ratio or by the presence of dyeing accelerants.

The blue dyes in combination with small amounts of red dyes are suitable for producing low-cost, dischargeable navy blue dyeings of good fastness to light, washing, perspiration, chlorine, sublimation, pleating and thermofixation, and together with red and yellow dyes for fast black dyeings.

In the following Examples the parts and percentages are by weight and the temperatures in degrees centigrade.

EXAMPLE 1

At 60–70° 6.9 parts of sodium nitrite are added slowly with vigorous stirring to 120 parts of concentrated sulphuric acid, after which stirring is continued for 10 minutes at 60° and the solution cooled to 10°. At this temperature 16.3 parts of 2-amino-5-nitrobenzonitrile are added. After 3 hours diazotization is complete. The sulphuric acid diazonium salt solution is run into a mixture of 19.1 parts of a compound of the formula

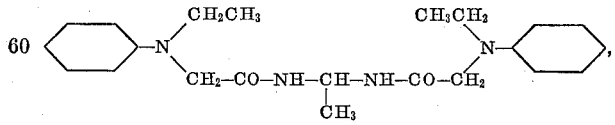

100 parts of glacial acetic acid, 750 parts of ice and 10 parts of aminosulphonic acid. The coupling reaction is finalized in acid medium by adjustment to pH 2.0–2.5 with sodium acetate. The dyed forms at once and settles out. It is filtered off, washed free of acid and dried. On synthetic fibers the dye obtained by this procedure gives rubine dyeings having excellent fastness properties.

EXAMPLE 2

13.8 Parts of sodium nitrite are added slowly with vigorous stirring to 240 parts of concentrated sulphuric acid at 60–70°. Stirring is continued for 10 minutes at 60°, and after cooling to 10° 200 parts of glacial acetic acid are added at 10–20°, followed by 2.7 parts of 2,5-dichloro-4-nitro-1-aminobenzene, 29.6 parts of 2,6-dibromo-4-nitro-1-aminobenzene in 200 parts of glacial acetic acid. Stirring is continued for 3 hours at 10–12° and the resulting diazonium salt solution then run into a mixture of 99.6 parts of a compound of the formula

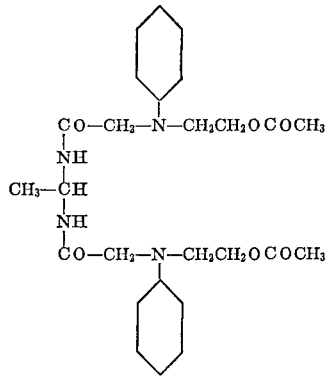

200 parts of glacial acetic acid, 800 parts of ice and 20 parts of aminosulphonic acid. The coupling is brought to a close in acid medium by adjustment to pH 2.0–2.5 with sodium acetate. The dye forms very rapidly and settles out to be filtered off, washed free of acid and dried. The heterogeneous dye thus obtained gives dyeings of yellow-brown shade on synthetic fibres which have excellent fastness properties.

EXAMPLE 3

(a) Preparation of the coupling component: A mixture of 279 parts of chloracetamide, 80 parts of paraldehyde and 12 parts of 10% sulphuric acid is reacted for 1 hour with heating on a water bath maintained at 95–100°. Subsequently 200 parts of water are added, the temperature of the mixture is raised until everything has gone into solution and it is then clarified by filtration. The filtrate is allowed to cool, on which the ethylene-bis-chloracetamide crystallizes out in the form of long white needles. When well cooled, the crystals are suctioned off and washed with water.

A mixture of 42.6 parts of the ethylene-bis-chloracetamide thus prepared, 37 parts of magnesium oxide, 50 parts of monoethylaniline and 1000 parts of dioxane is entered into an autoclave and reacted for 12–15 hours at 140–150°. The reaction mixture is then allowed to cool, the unconsumed magnesium oxide and the newly formed magnesium chloride are filtered off and the remaining solution evaporated to dryness. The residue is submitted to vacuum distillation to distil off the excess monoethylaniline which leaves the coupling component of formula

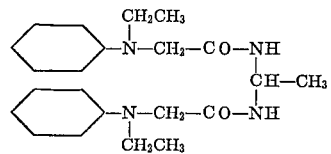

(b) Production of the dye: With vigorous stirring 6.9 parts of sodium nitrite are added slowly to 120 parts of concentrated sulphuric acid at 60–70°, and stirring is continued for 10 minutes at 60° before cooling to 10°. At 10–20° 100 parts of glacial acetic acid are added, followed by 20.7 parts of 2,6-dichloro-4-nitro-1-aminobenzene and after by 100 parts of glacial acetic acid. Stirring is continued for 3 hours at 10–12°, then the resulting diazonium salt solution is poured into a mixture of 19.1 parts of the compound of the formula

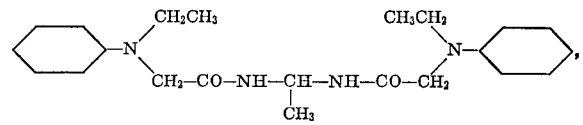

100 parts of glacial acetic acid, 750 parts of ice and 10 parts of aminosulphonic acid. The coupling reaction is completed in acid medium by adjustment with sodium acetate to pH 2.0–2.5. The dye forms immediately and settles out. It is filtered off, washed free of acid and dried. The dye thus obtained dyes synthetic fibres in yellow-brown shades of excellent all-round fastness.

EXAMPLE 4

(a) Preparation of the coupling component: 200 Parts of finely pulverized monochloracetamide are entered with stirring into a solution of 4 parts of potassium carbonate in 162 parts of 40% formaldehyde. The suspension is heated gently on a water bath until a clear solution forms, on which it is allowed to cool again, causing precipitation of the formed N-methylolchloracetamide as a thick crystal slurry. This is filtered off, recrystallized from acetone or benzene and dried.

100 Parts of the N-methylolchloracetamide are dissolved in 250 parts of concentrated sulphuric acid with cooling at 20–25°. The solution is allowed to stand overnight and then dropped into 2000 parts of ice, on which the methylene-bis-chloracetamide settles out. It is filered off, washed with a little cold water and crystallized from alcohol. The pure methylene-bis-chloracetamide is obtained in the form of white scales of melting point 175°.

A batch of 39.8 parts of this methylene-bis-chloracetamide, 50 parts of monoethylaniline, 32 parts of magnesium oxide and 1000 parts of dioxan is set in an autoclave and reacted for 12–15 hours at 140–150° with stirring. On cooling the reaction mixture is filtered, the filtrate evaporated to dryness and the unconsumed monoethylaniline distilled off to purify the remaining product. This product has the formula

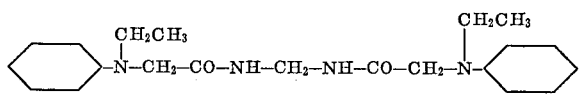

(b) Production of the dye: 6.9 Parts of sodium nitrite are added at 60–70° with vigorous stirring to 120 parts of concentrated sulphuric acid. Stirring is continued for 10 minutes, then at 60° 20.6 parts of 1-amino-2-chloro-4-methylsulphonylbenzene are slowly added. The temperature is held at 60° for about 20–40 minutes. After cooling to room temperature the diazonium salt solution obtained is run into a mixture of 18.4 parts of a compound of formula

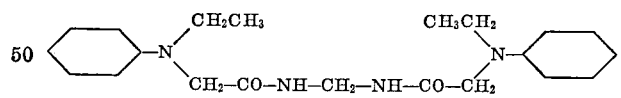

prepared as given in the foregoing, 300 parts of glacial acetic acid, 750 parts of ice and 10 parts of aminosulphonic acid. The coupling reaction is brought to completion in acid medium by adjustment with sodium acetate to pH 2.0–2.5. The dye forms very rapidly and settles out, to be filtered off, washed free of acid and dried. This dye gives dyeings of orange shade on synthetic fibres with excellent fastness properties.

DYEING EXAMPLE 1

A mixture of 7 parts of the dye of Example 1, 4 parts of sodium dinaphthylmethanedisulphonate, 4 parts of sodium cetylsulphate and 5 parts of sodium sulphate is ground in a ball mill for 48 hours to give a fine powder. 2 Parts of this powder are dispersed in a bath consisting of 3000 parts of water, 3 parts of a 30% solution of a highly sulphonated castor oil and 20 parts of an emulsion of a chlorinated benzene. 100 parts of a fabric of "Dacron" (registered trade mark) polyester fibre are entered into the bath at 20–25°, which is then raised to 95–100° over about 30 minutes and held at this temperature for one hour. The fabric is removed, rinsed, soaped for 15 minutes at 70°, with a 0.1% solution of an alkylphenylpolyglycol ether, rinsed again and dried. A rubine dyeing having excellent fastness properties is obtained.

DYEING EXAMPLE 2

A mixture of 30 parts of the heterogeneous dye of Example 2, 40 parts of sodium dinaphthylmethanedisulphonate, 50 parts of sodium cetylsulphate and 50 parts of anhydrous sodium sulphate is ground in a ball mill for 48 hours. 4 Parts of the fine dye powder thus formed are added to 1000 parts of water at 40-50°. 100 Parts of a scoured fabric of "Terylene" (registered trademark) polyester fibre are entered into the bath, which is then raised slowly to 130° and held at this temperature for about one hour under pressure. On removal the fabric is rinsed, soaped, rinsed again and dried. A yellow-brown dyeing with excellent fastness properties is obtained.

DYEING EXAMPLE 3

A fine aqueous dispersion of 30 parts of the heterogeneous dye of Example 2, 70 parts of sodium dinaphthylmethanedisulphonate and 3 parts of sodium alginate is made up to 1000 parts with water and vigorously mixed. This liquor is padded on a polyester fibre at 20°. The padded fabric is air dried at 60-100° and fixed by exposure for one minute to dry heat at 230°. After fixation the fabric is rinsed, soaped, rinsed again and dried. A level yellow-brown dyeing showing good fastness properties is obtained.

DYEING EXAMPLE 4

A mixture of 7 parts of the dye of Example 1, 4 parts of sodium dinaphthylmethanedisulphonate, 4 parts of sodium cetylsulphate and 5 parts of anhydrous sodium sulphate is ground in a ball mill for 48 hours to give a fine powder. 2 Parts of this powder are dispersed in 3000 parts of water containing 3 parts of a 30% solution of a highly sulphonated castor oil. At 20-25° 100 parts of a cellulose diacetate fabric are entered and the bath raised to 80-82° over about 30 minutes. The fabric is dyed for one hour at this temperature. On removal it is soaped, rinsed, soaped again and dried. A rubine dyeing having good fastness properties is obtained.

The formulae of further dyes conforming to this invention are set forth in the following table.

| Example No. | Dyestuff | Shade on polyester |
|---|---|---|
| 3 | 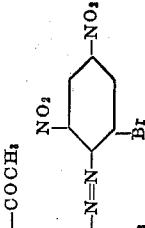 | Blue. |
| 4 | 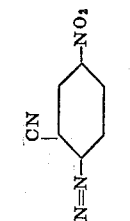 | Red. |
| 5 | 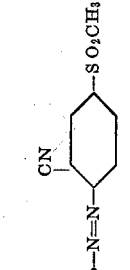 | Rubine red. |
| 6 | 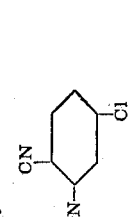 | Orange. |
| 7 | 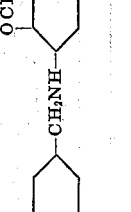 | Blue. |

| Example No. | Dyestuff | Shade on polyester |
|---|---|---|
| 8 | | Yellow brown. |
| 9 | | Violet. |
| 10 | | Red. |
| 11 | | Blue. |
| 12 | | Do. |
| 13 | | Rubine red. |
| 14 | | Scarlet. |
| 15 | | Red. |

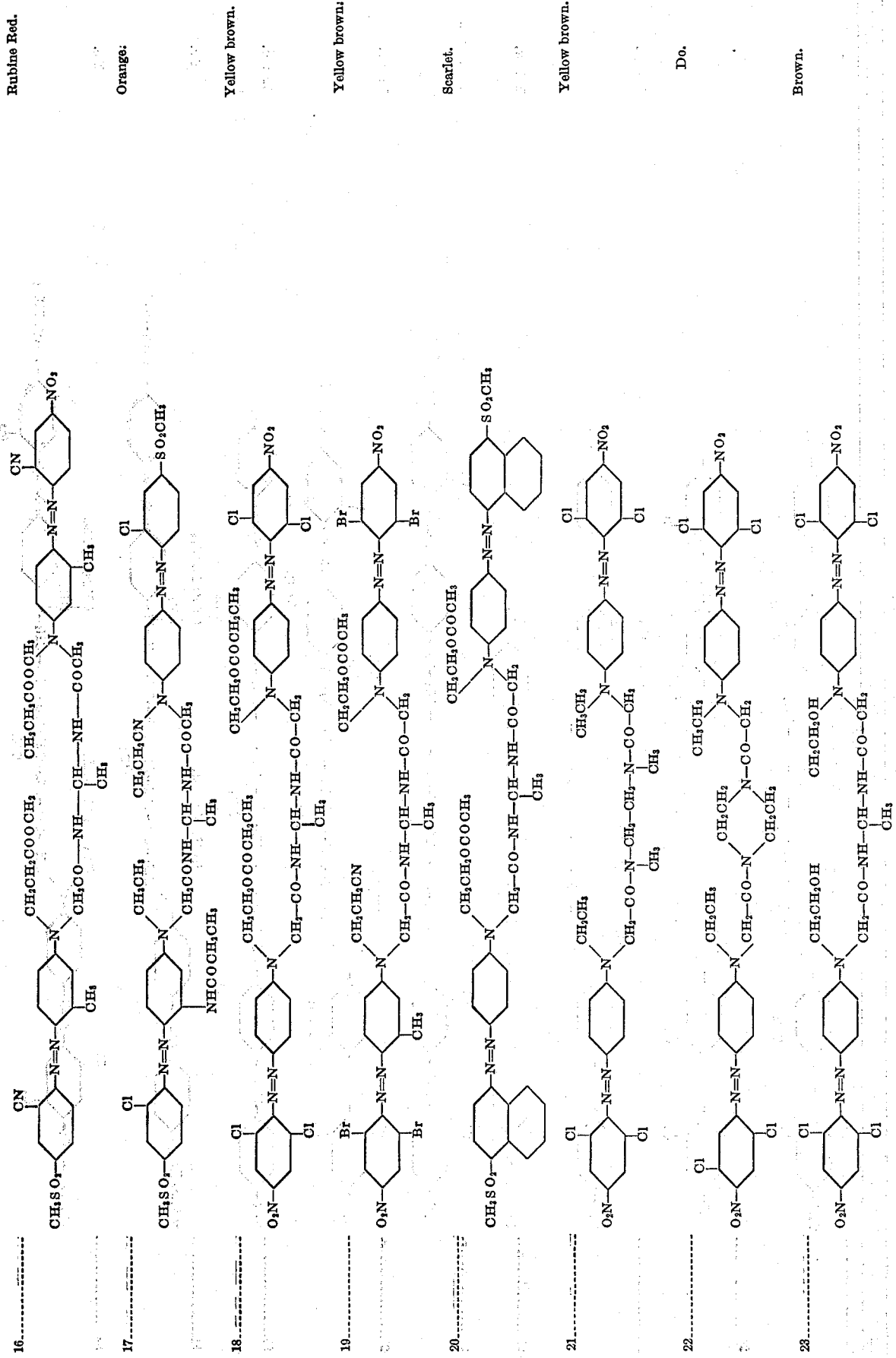

TABLE—Continued

| Example No. | Dyestuff | Shade on polyester |
|---|---|---|
| 24 | (structure) | Brown |
| 25 | (structure) | Do. |
| 26 | (structure) | Orange. |
| 27 | (structure) | Yellow. |
| 28 | (structure) | Orange red. |
| 29 | (structure) | Brown. |
| 30 | (structure) | Orange. |
| 31 | (structure) | Do. |
| 32 | (structure) | Do. |

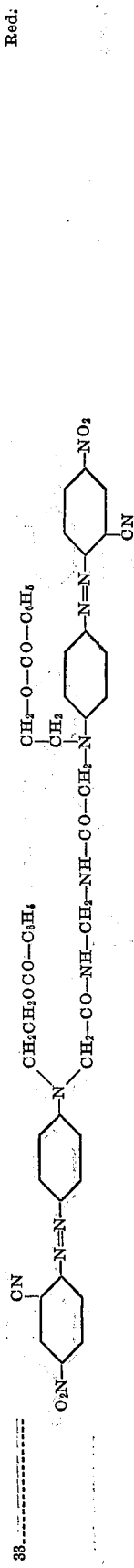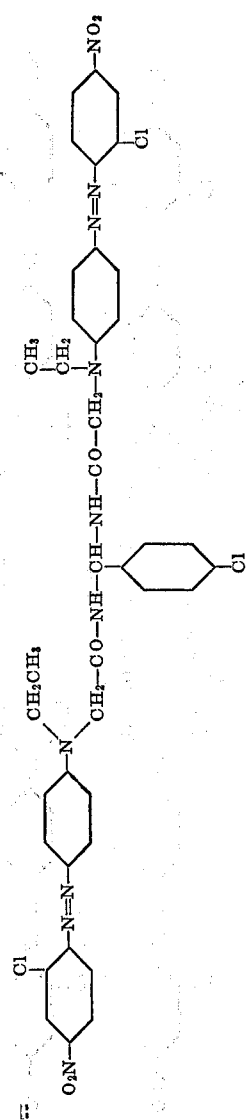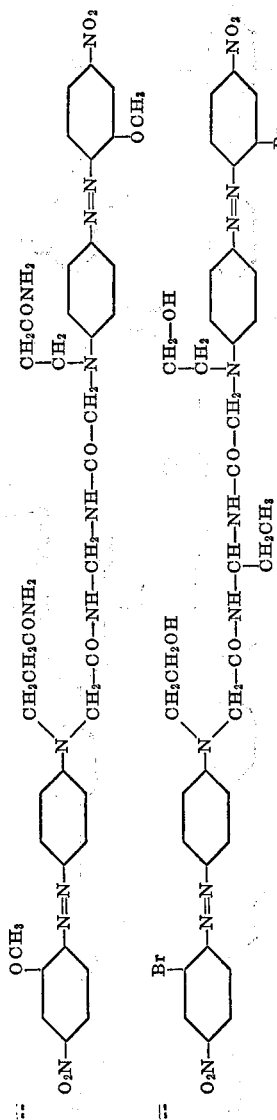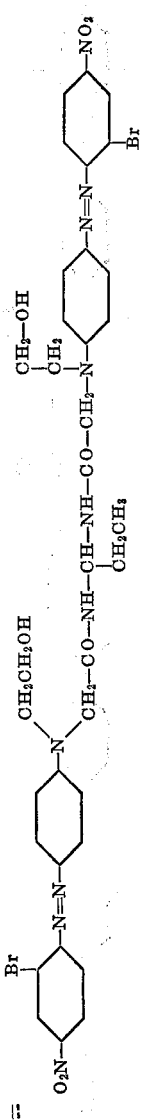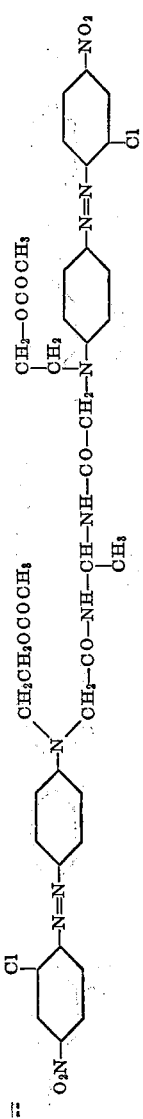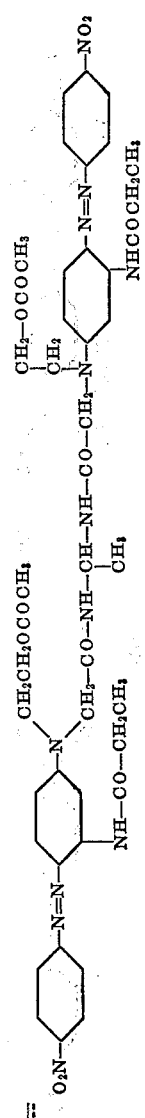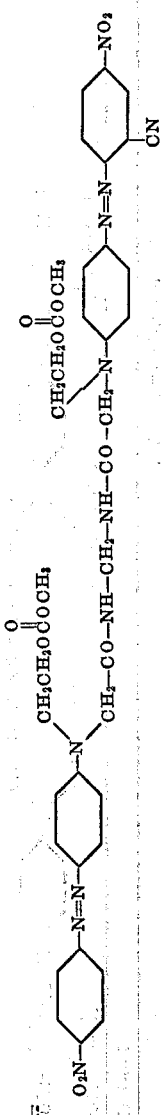

TABLE—Continued

| Example No. | Dyestuff | Shade on polyester |
|---|---|---|
| 40 | | Violet. |
| 41 | | Scarlet. |
| 42 | | Red. |
| 43 | | Orange. |
| 44 | | Scarlet. |
| 45 | | Brown. |
| 46 | | Rubine red. |
| 47 | | Violet. |

| | | |
|---|---|---|
| 48 | 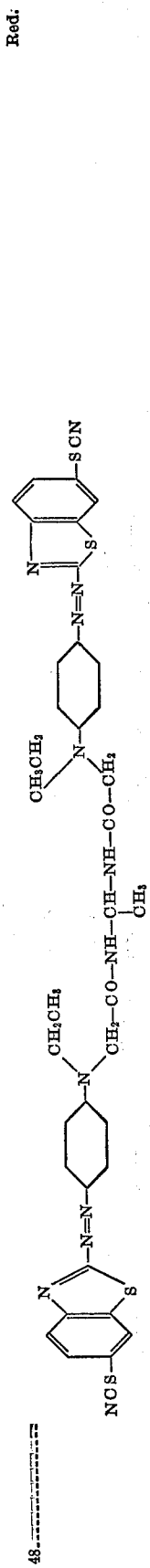 | Red. |
| 49 | 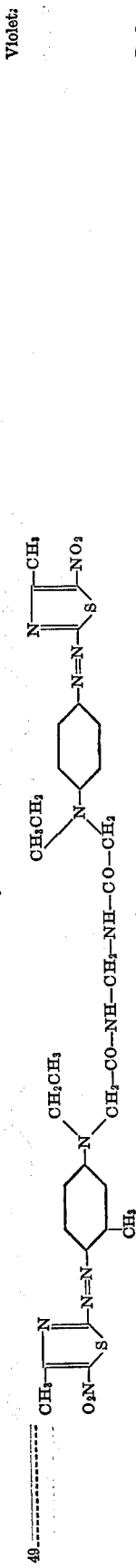 | Violet. |
| 50 | 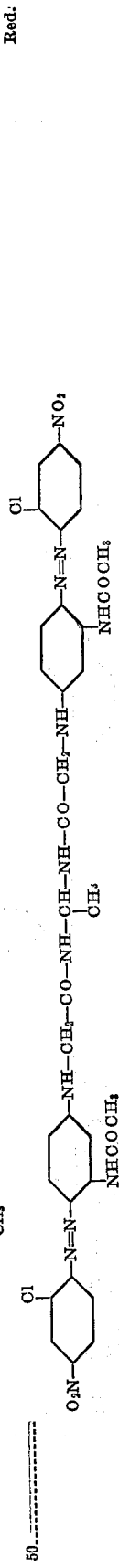 | Red. |
| 51 | 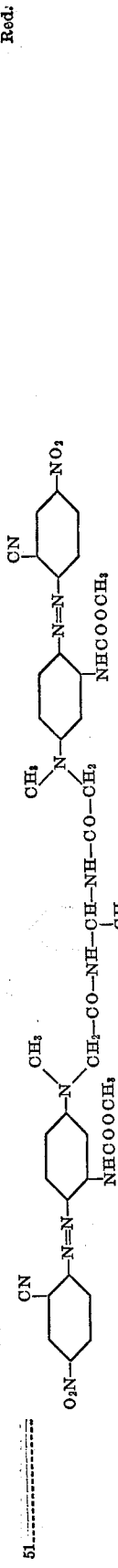 | Red. |
| 52 | 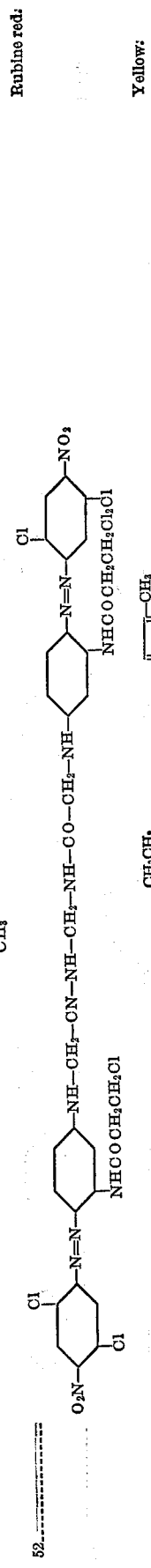 | Rubine red. |
| 53 | 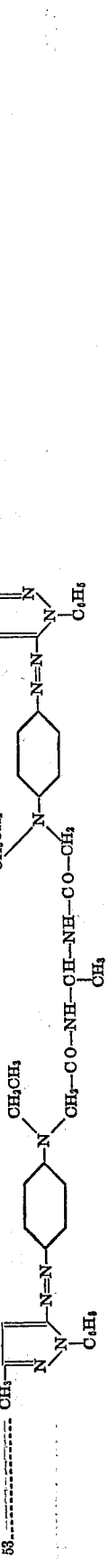 | Yellow. |
| 54 | 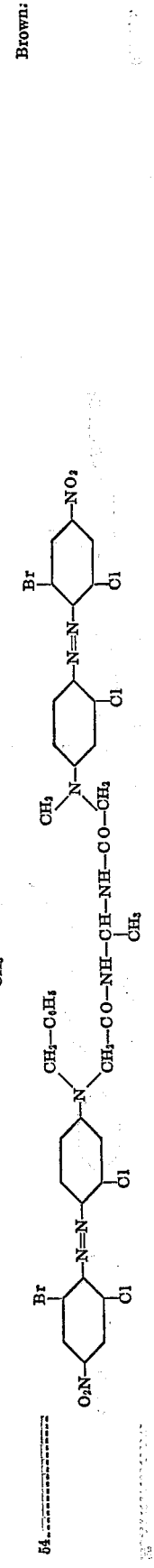 | Brown. |
| 55 | 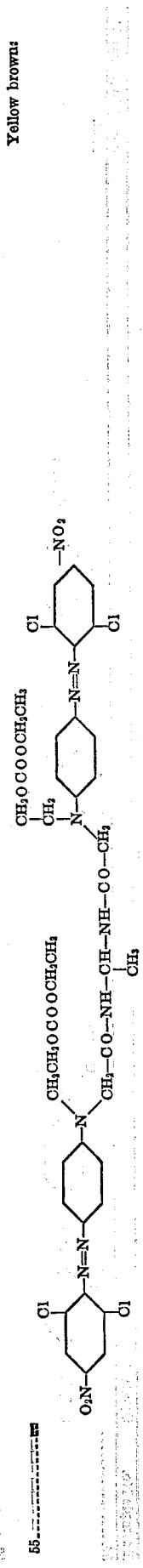 | Yellow brown. |

| Example No. | Dyestuff | Shade on polyester |
|---|---|---|
| 56 | (structure) | Red. |
| 57 | (structure) | Orange. |
| 58 | (structure) | Violet. |
| 59 | (structure) | Red. |
| 60 | (structure) | Brown. |
| 61 | (structure) | Orange. |

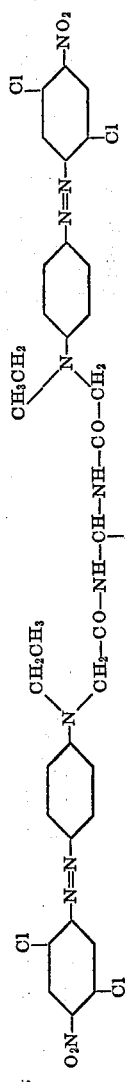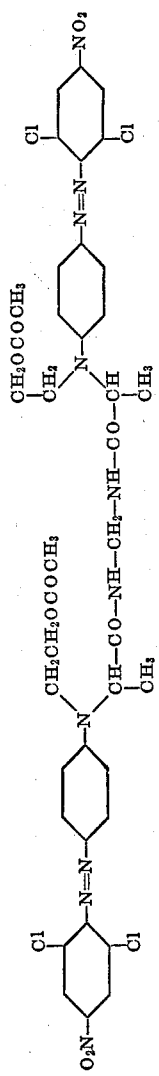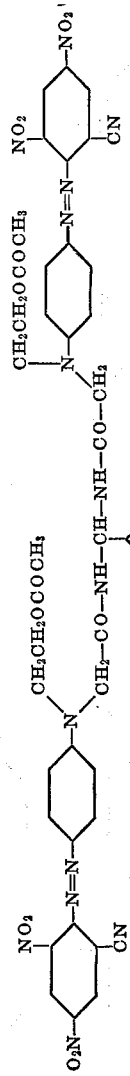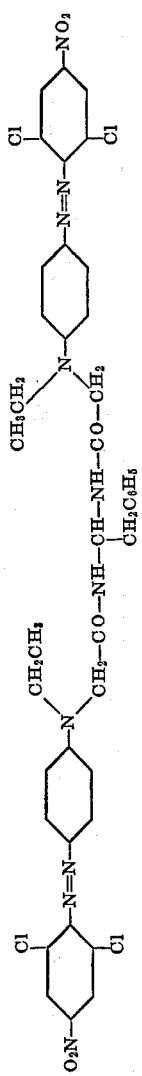

TABLE—Continued

| Example No. | Dyestuff | Shade on polyester |
|---|---|---|
| 67 | | Orange. |
| 68 | | Yellow brown. |
| 69 | | Violet. |
| 70 | | Orange. |
| 71 | | Yellow brown. |
| 72 | | Rubine red. |
| 73 | | Scarlet red. |
| 74 | | Yellow brown. |

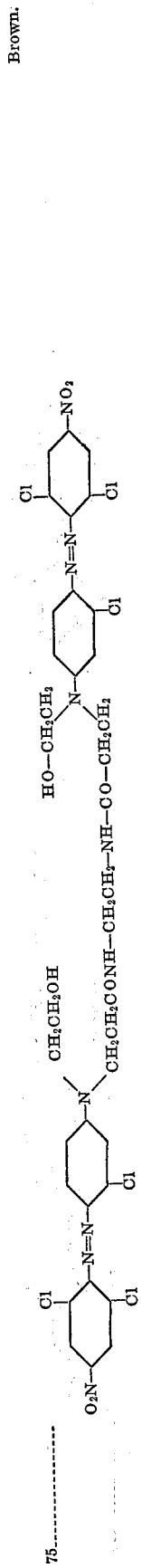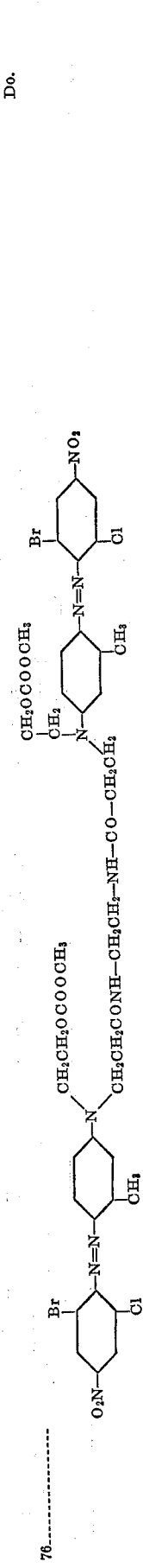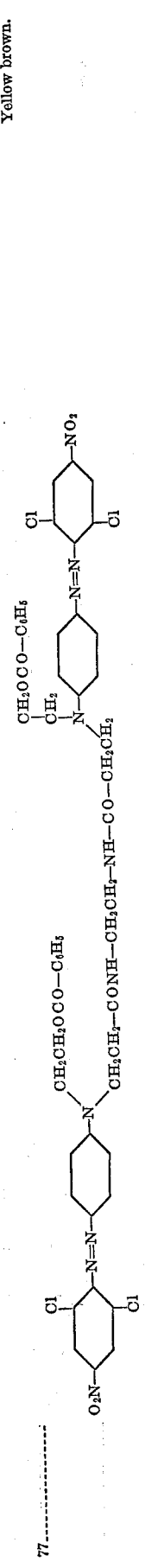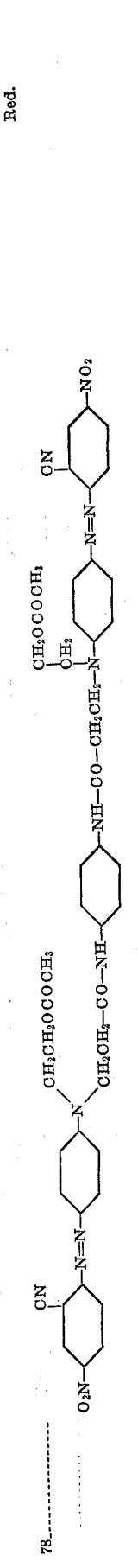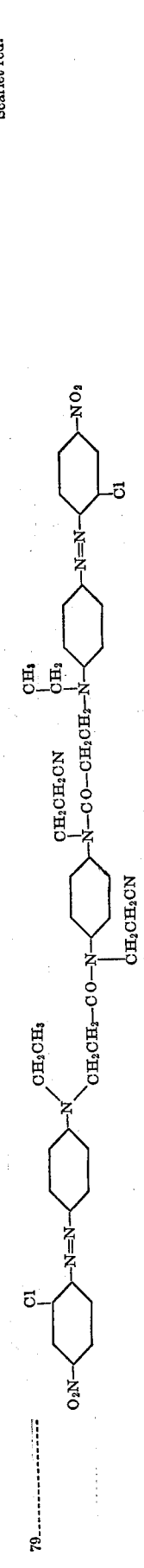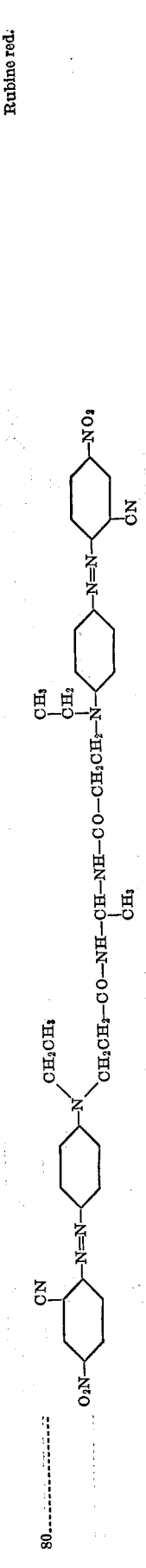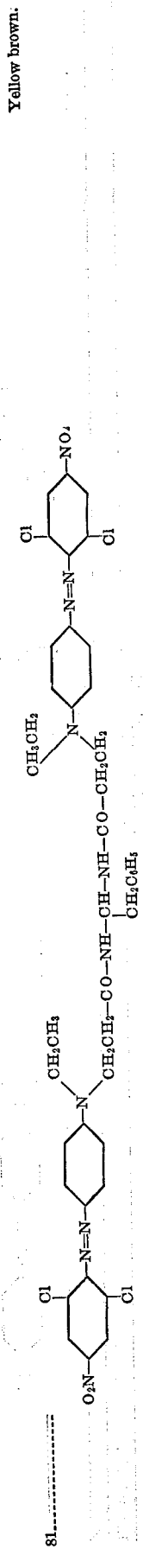

TABLE—Continued

| Example No. | Dyestuff | Shade on polyester |
|---|---|---|
| 82 | | Blue. |
| 83 | | Do. |
| 84 | | Do. |
| 85 | | Do. |
| 86 | | Do. |
| 87 | | Do. |
| 88 | | Do. |

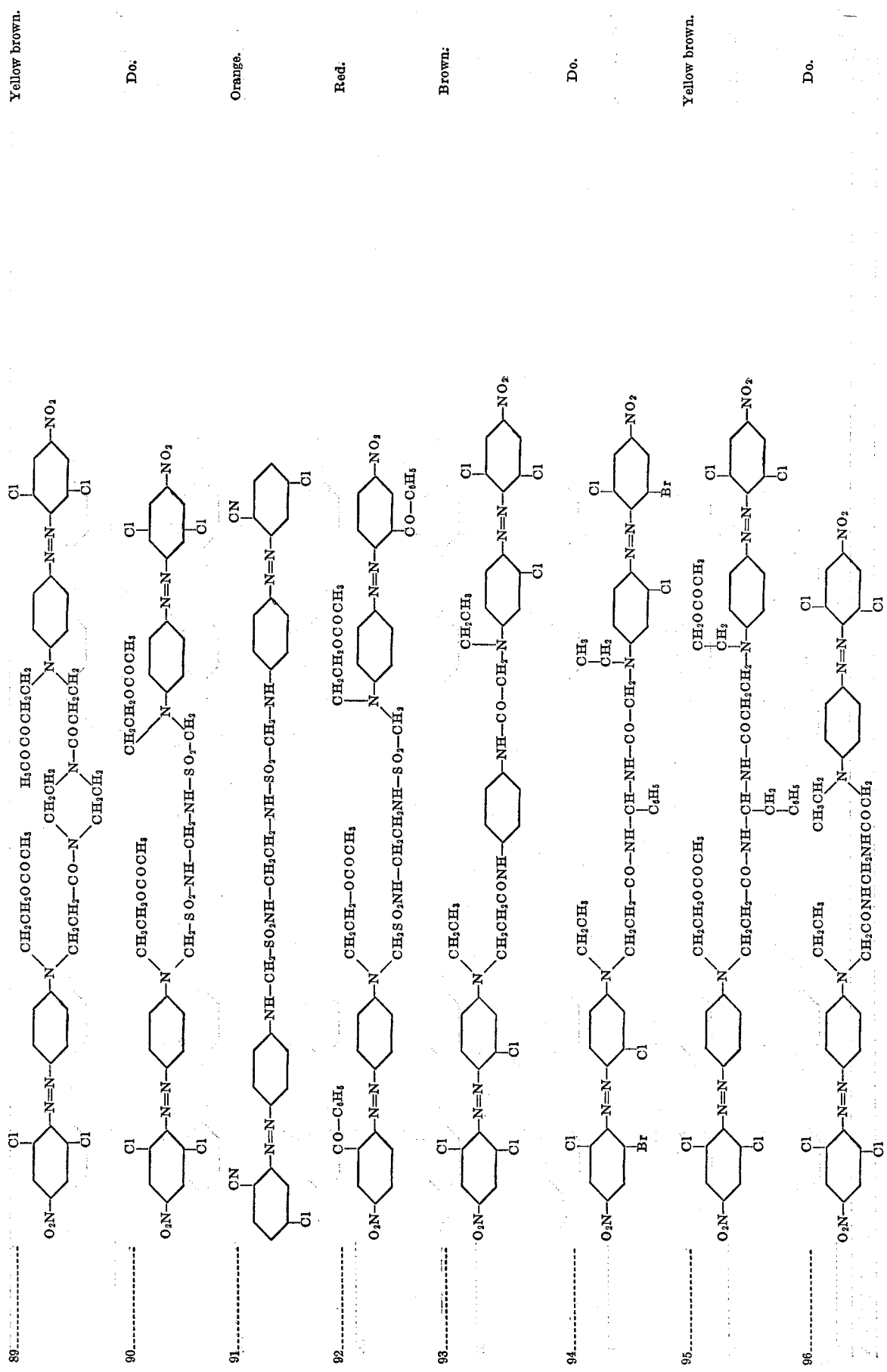

TABLE—Continued

| Example No. | Dyestuff | Shade on polyester |
|---|---|---|
| 97 | | Reddish-brown. |
| 98 | | Red brown. |
| 99 | | Yellow brown. |
| 100 | | Do. |
| 101 | | Do. |
| 102 | | Red brown. |
| 103 | | Yellow brown. |

Representative Dyestuffs of the foregoing Examples are as follows:

| Ex. | Dyestuff |
|---|---|
| 1 | |
| 3 | |
| 96 | |
| 97 | |
| 98 | |
| 99 | |
| 100 | |
| 101 | |
| 102 | |
| 103 | |

Having thus disclosed the invention what we claim is:

1. Azo dye free from carboxylic acid and sulphonic acid groups and of the formula

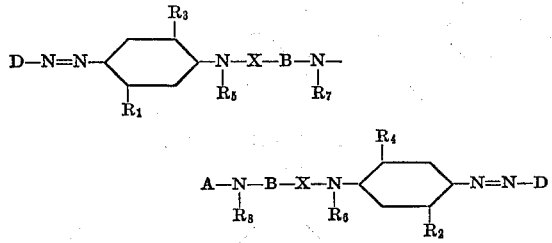

(I)

wherein each D is, independently, an aromatic diazo component radical;

each of $R_1$ and $R_2$ is, independently, a member selected from the group consisting of hydrogen, halo, acylamino, alkyl and alkoxy;

each of $R_3$ and $R_4$ is, independently, a number selected from the group consisting of hydrogen, halo, alkyd or alkoxy;

each of $R_5$ and $R_6$ is, independently, a member selected from the group consisting of hydrogen and alkyl;

each of $R_7$ and $R_8$ is, independently, a member selected from the group consisting of hydrogen and alkyl;

or $R_7$ and $R_8$, jointly, are alkylene;

each X is a divalent hydrocarbon radical;

each B is one of —CO— and —SO$_2$—;

A is a member selected from the group consisting of alkylene, substituted alkylene, phenylene and substituted phenylene;

each acyl is of one of the formulae: R—Y— and R'—Z—,

R is a member selected from the group consisting of alkyl and phenyl;

Y is one of —O—CO— and —SO$_2$—;

R' is a member selected from the group consisting of alkyl, phenyl and hydrogen;

Z is a member selected from the group consisting of —CO—, —NR''CO— and —NR''SO$_2$—;

R'' is hydrogen or R;

each alkyl and each alkoxy is substituted or unsubstituted, any substituent thereon being a member selected from the group consisting of halo, phenyl, alkoxy, cyano, thiocyano, acyl and acyloxy;

each radical of an aromatic diazo component is substituted or unsubstituted, any substituent thereon being a member selected from the group consisting of halo, alkyl, alkoxy, cyano, nitro, thiocyano,

—CH=N—OH, acyl, acyloxy and acrylamino;

and each phenyl nucleus is substituted or unsubstituted, any substituent thereon, unless otherwise defined, being a member selected from the group consisting of chloro, bromo, nitro, methyl, methoxy and acetoxy.

2. Azo dye according to claim 1 wherein D is phenyl, substituted phenyl, naphthyl or substituted naphthyl, any substituent of substituted phenyl or of substituted naphthyl being a member selected from the group consisting of chloro, bromo, phenyl, alkoxy, cyano, thiocyano, acyl and acyloxy.

3. An azo compound free from sulphonic acid and carboxylic acid groups and of the formula

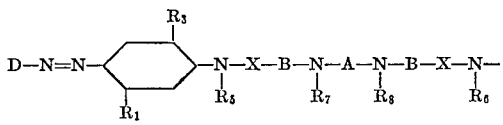

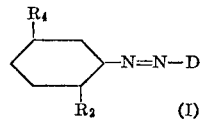

(I)

wherein each D is, independently, phenyl or phenyl substituted by a member selected from the group consisting of chloro, bromo, cyano, nitro, methylsulphonyl, benzylsulphonyl, methylaminosulphonyl, dimethylaminosulphonyl, acetylamino and —CH=N—OH;

each of R$_1$ and R$_2$ is, independently, a member selected from the group consisting of hydrogen, chloro, bromo, methyl, methoxy, acetylamino, propionylamino, chloropropionylamino and methoxycarbonylamino;

each of R$_3$ and R$_4$ is, independently, a member selected from the group consisting of hydrogen, chloro, bromo, methyl, methoxy and ethoxy;

each of R$_5$ and R$_6$ is, independently, hydrogen, alkyl having from 1 to 3 carbon atoms, or alkyl having from 1 to 3 carbon atoms substituted by a member selected from the group consisting of hydroxy, methoxy, ethoxy, cyano, phenyl, formyloxy, acetoxy, propionyloxy, benzoyloxy, methoxycarbonyl, methoxycarbonyloxy, ethoxycarbonyloxy and aminocarbonyl;

each of R$_7$ and R$_8$ is, independently, a member selected from the group consisting of hydrogen, methyl and cyanoethyl;

or

R$_7$ and R$_8$, jointly, are ethylene;

each X is a member selected from the group consisting of —CH$_2$—, —CH$_2$CH$_2$—,

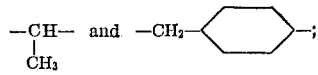

each B is one of —CO— and —SO$_2$—;

A is a bridge member selected from the group consisting of —CH$_2$—,

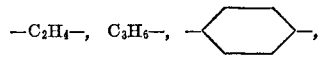

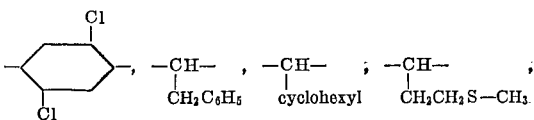

and —CH— ;
     |
     phenyl and each phenyl nucleus is substituted or unsubstituted, any substituent thereon, unless otherwise defined, being a member selected from the group consisting of chloro, bromo, nitro, methyl, methoxy and acetoxy.

4. An azo compound according to claim 3 of the formula

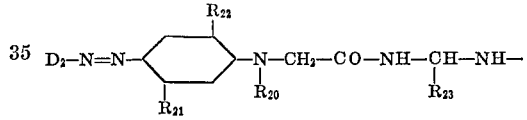

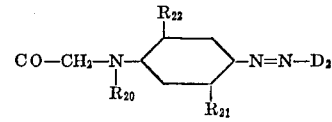

(III)

wherein each D$_2$ is, independently, phenyl substituted by a member selected from the group consisting of chloro, bromo, cyano, nitro and methylsulphonyl;

each R$_{20}$ is, independently, hydrogen, ethyl or ethyl substituted by a member selected from the group consisting of chloro, cyano, acetoxy, propionyloxy and methoxycarbonyl;

each R$_{21}$ is, independently, hydrogen, chloro, bromo, methyl, methoxy, acetylamino and propionylamino;

each R$_{22}$ is, independently, a member selected from the group consisting of hydrogen, methoxy and ethoxy; and R$_{23}$ is a member selected from the group consisting of methyl, ethyl and phenyl.

5. The compound according to claim 3 of the formula

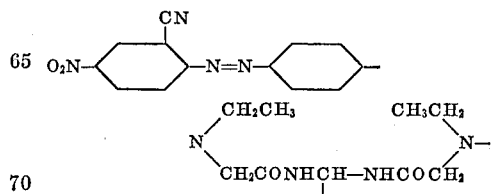

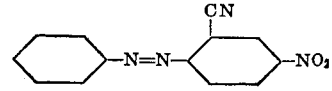

6. The compound according to claim 3 of the formula

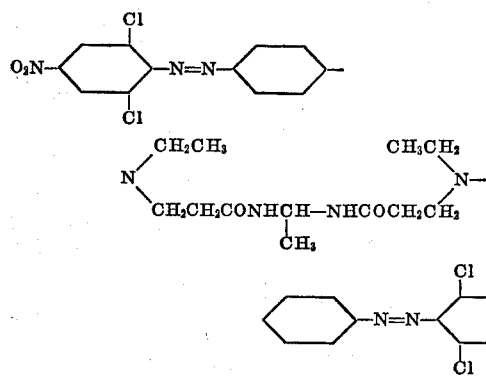

7. The compound according to claim 3 of the formula

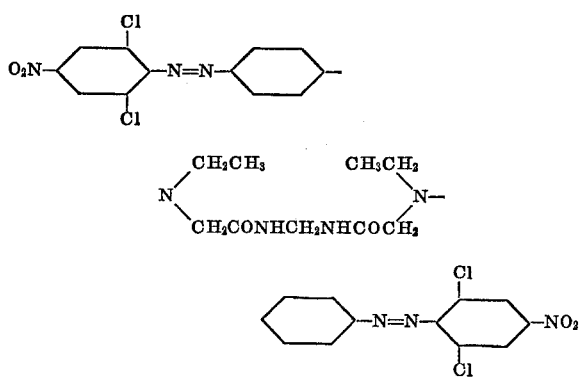

8. The compound according to claim 3 of the formula

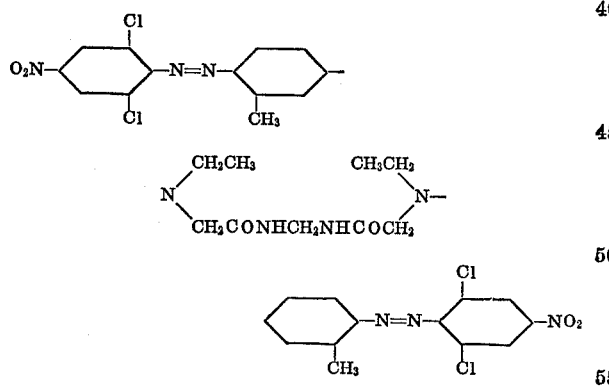

9. The compound according to claim 3 of the formula

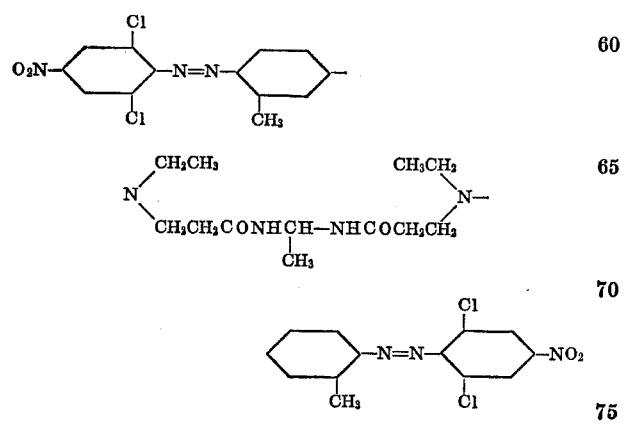

10. The compound according to claim 3 of the formula

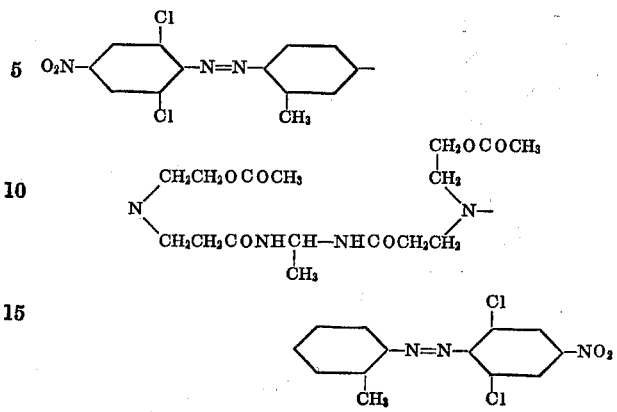

11. The compound according to claim 3 of the formula

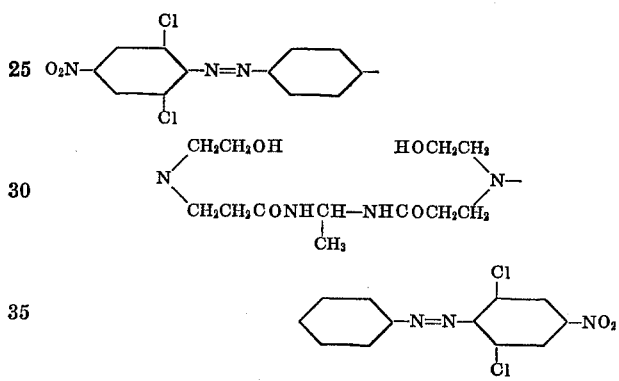

12. The compound according to claim 3 of the formula

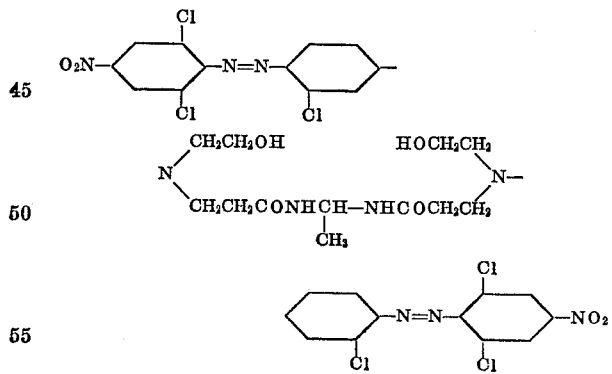

13. The compound according to claim 3 of the formula

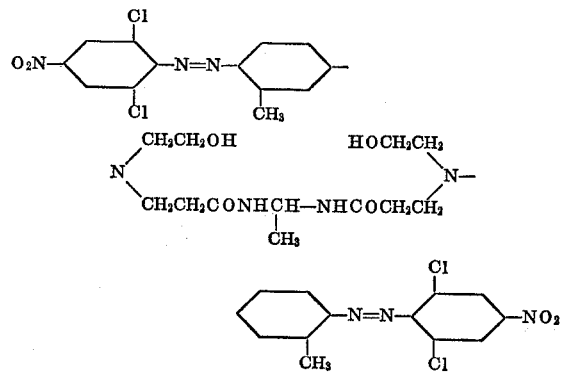

14. The compound according to claim 3 of the formula
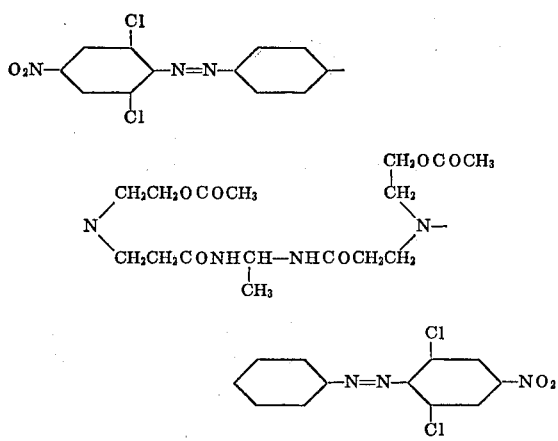
References Cited
UNITED STATES PATENTS
| | | | |
|---|---|---|---|
| 2,115,149 | 4/1938 | Saunders | 260—184 X |
| 2,149,703 | 3/1939 | Markush et al. | 260—178 |
| 2,164,785 | 7/1939 | Rossander | 260—178 |
| 2,263,994 | 11/1941 | Knight | 260—178 X |
| 2,286,391 | 6/1942 | Sparks | 260—178 X |
| 2,330,291 | 9/1943 | Kirby | 260—160 X |
| 2,494,416 | 1/1950 | Straub et al. | 260—160 |
| 3,007,915 | 11/1961 | Merian | 260—158 |
| 3,271,383 | 9/1966 | Yamaya et al. | 260—158 |
| 3,415,809 | 12/1968 | Fisher et al. | 260—158 |
FOREIGN PATENTS
| | | | |
|---|---|---|---|
| 473,865 | 7/1969 | Switzerland | 260—178 |
FLOYD DALE HIGEL, Primary Examiner
U.S. Cl. X.R.
8—41 C, 50; 260—158, 160, 174, 178, 187, 490, 558 A

UNITED STATES PATENT OFFICE
CERTIFICATE OF CORRECTION

Patent No. 3,838,145　　　　　　　　　Dated September 24, 1974

Inventor(s) RUEDI ALTERMATT

It is certified that error appears in the above-identified patent and that said Letters Patent are hereby corrected as shown below:

Column 1, below line 5, "Basel-Land, Switzerland" insert --assignor to Sandoz Ltd., Basle, Switzerland.--.

Signed and Sealed this

Thirty-first Day of August 1976

[SEAL]

Attest:

RUTH C. MASON
Attesting Officer

C. MARSHALL DANN
Commissioner of Patents and Trademarks